United States Patent [19]
Mishina et al.

[11] Patent Number: 5,203,487
[45] Date of Patent: Apr. 20, 1993

[54] REFLOW SOLDERING METHOD AND SYSTEM THEREFOR

[75] Inventors: Haruo Mishina, Ushiku; Masato Itagaki, Kashiwa; Masahumi Wada, Nagareyama, all of Japan

[73] Assignee: Hitachi Techno Engineering Co., Ltd., Tokyo, Japan

[21] Appl. No.: 857,334

[22] Filed: Mar. 25, 1992

[30] Foreign Application Priority Data

Mar. 26, 1991 [JP] Japan ................................. 3-61453

[51] Int. Cl.⁵ .......................... B23K 1/00; B23K 1/012
[52] U.S. Cl. .................................. 228/102; 228/232; 228/9; 219/388; 432/152
[58] Field of Search ............... 228/102, 180.2, 219, 228/232, 9, 42; 219/388, 449; 432/49, 152, 199

[56] References Cited

U.S. PATENT DOCUMENTS

| | | | |
|---|---|---|---|
| 4,775,776 | 10/1988 | Rahn et al. | 219/388 |
| 4,832,249 | 5/1989 | Ehler | 228/232 |
| 4,876,437 | 10/1989 | Kondo | 219/388 |
| 4,909,430 | 3/1990 | Yokota | 219/388 |
| 5,039,841 | 8/1991 | Kato et al. | 219/388 |
| 5,069,380 | 12/1991 | Deambrosio | 228/42 |

FOREIGN PATENT DOCUMENTS

| | | | |
|---|---|---|---|
| 62-252670 | 11/1987 | Japan | 219/388 |
| 63-177960 | 7/1988 | Japan | 219/388 |

Primary Examiner—Samuel M. Heinrich
Attorney, Agent, or Firm—Antonelli, Terry, Stout & Kraus

[57] ABSTRACT

In a method and a system in which while carrying objects to be treated to a preheating chamber and a reflow chamber adjacent thereto, hot gases are blown against the objects to be treated by cross flow blowers provided in the preheating chamber and the reflow chamber to melt solder so as to solder electronic parts on a circuit substrate; a free air introducing port is controllably provided in the vicinity of an intake port of the cross flow blower in the preheating chamber, and an exhaust port and an exhaust fan for exhausting gases having an amount corresponding to the free air taken from the free air introducing port, out of the preheating chamber are provided.

8 Claims, 11 Drawing Sheets

REFLOW SOLDERING METHOD AND SYSTEM THEREFOR

BACKGROUND OF THE INVENTION

The present invention relates to a reflow soldering method and system therefor in which electronic parts are soldered on a circuit substrate by heat gas obtained by heating air or the like, and particularly to a reflow soldering method and system therefor which facilitates temperature adjustment of a temperature equalizing portion in a preheating chamber and individually changes temperatures of the heat gas according to heat capacity widthwise of the circuit substrate.

In the past, a dipping method and a jet method have been used to solder electronic parts on a circuit substrate. Recently, with a trend toward high density and a trend toward surface packaging of packaging substrates, a reflow method has been widely used as a soldering method in view of reliability and productivity.

A typical reflow soldering is a vapor reflow method in which an object to be treated is put into a saturated vapor generated by heating and boiling a fluorine system inert liquid as a heat medium, and the object is evenly heated by latent heat to carry out soldering. This technology is disclosed, for example, in Japanese Patent Laid-Open No. 62-252670. The vapor reflow method is excellent in reliability and productivity but the heat medium is expensive and becomes consumed. Therefore, operating cost is high.

A reflow soldering apparatus using hot air, is disclosed, for example, in Japanese Patent Laid-Open No. 63-177960. This technique will be described hereinbelow with reference to FIGS. 21 and 22.

As shown in FIGS. 21 and 22, the reflow soldering apparatus comprises a preheating chamber first zone 1A, a preheating chamber second zone 2A, a reflow chamber 3A and a cooling chamber 4A. Hot air circulating mechanisms each comprising a heating heater 7 or an infrared face heater 16, a propeller fan 37 and a straightening plate 38 in the respective chambers are basically the same.

Hot air heated by the heating heater 7 or the infrared face heater 16 enters a side plate passage 39 from an outlet port 31 and moves upward, after which it is drawn into the propeller fan 37. The hot air elevated in pressure by the propeller fan 37 is straightened by the straightening plate 38 and is evenly blown against an object 11 to be treated from the top. The objects 11 are sequentially carried to the preheating chamber first zone 1A, the preheating chamber second zone 2A and the reflow chamber 3A by a conveyor 12 so that the objects 11 are heated under the adequate temperature condition and cooled by a cooling fan 13 in a cooling chamber 4A to complete soldering.

In FIGS. 21 and 22, reference numerals 14, 15 and 20 designate a driving sprocket wheel, an idler and a driving motor, respectively, for driving the conveyor 12.

SUMMARY OF THE INVENTION

It is assured that the aforementioned conventional technique has the following problems.

The preheating chamber second zone functions to maintain the temperature of hot gas in the chamber substantially constant to equalize temperatures in various portions on the circuit substrate. However, a temperature difference between the preheating chamber second zone and the reflow chamber reaches 50° to 70° C. Particularly in the case where air velocity of the reflow chamber is high, hot air in the high temperature reflow chamber leaks into the preheating chamber second zone so that the temperature of the hot gas rises to render impossible to set the temperature to a predetermined value, failing to equalize the temperature of a soldering portion.

If an actual object to be treated is a circuit substrate, various electronic parts which are different in dimension and shape from each other are disposed on the circuit substrate and therefore the heat capacity is sometimes extremely different widthwise. In this case, even if the hot gas is widthwise evenly blown, the temperature of a soldering portion is not equalized, resulting in defective soldering such as unfused soldering paste, a soldering bridge or the like.

In order to evenly blow hot gas in the carrying direction and widthwise of the circuit substrate, it is necessary to add resistance members such as the straightening plate shown in FIG. 21 or a flat plate provided with scattered blow holes. However, this results in an increase of load of a blower due to the resistance members and a resultant increase of electric power and noises.

The aim of present invention is to solve the problems noted above with respect to prior art and provide a reflow soldering method and system therefor which can evenly preelevate the temperatures of soldering portions of various circuit substrates different in heat capacity and electronic parts to be mounted.

It is a further object of the present invention to provide a reflow soldering method and system therefor which can evenly preelevate the temperatures of soldering portions of various circuit substrates parts to be mounted.

For achieving the aforesaid objects, according to the present invention, there is provided a reflow soldering method for sequentially heating objects to be treated in which electronic parts are placed on a circuit substrate coated with solder while being carried into a preheating chamber and a reflow chamber adjacent thereto to fuse the solder and soldering said electronic parts on said circuit substrate, wherein a temperature at which the object is heated in said preheating chamber is adjusted according to heat capacity of the electronic parts on said circuit substrate and high temperature hot gas which leaks into said preheating chamber from said reflow chamber.

More specifically, either low temperature gas is introduced into the preheating chamber, or at least a part of high temperature hot gas which leaks into the preheating chamber from the reflow chamber is exhausted.

For achieving the aforesaid objects, according to the present invention, there is further provided a reflow soldering apparatus in which, while carrying objects to be treated in which electronic parts are placed on a circuit substrate coated with solder into a preheating chamber and a reflow chamber adjacent thereto, hot gas is blown against said objects by cross flow blowers provided in said preheating chamber and the reflow chamber to melt solder so as to solder the electronic parts on said circuit substrate, wherein free air (i.e. outside air) introducing means is controllably provided in the vicinity of an intake port of the cross flow blower in said preheating chamber.

According to the characteristic of the apparatus, as means in response to hot gas which leaks into the preheating chamber from the reflow chamber, more specifically, at least either means for introducing low temperature gas into the preheating chamber or means for exhausting at least a part of hot gas leaking into the preheating chamber from the reflow chamber is provided; and as means in response to heat capacity of electronic parts on a circuit substrate, more specifically, at least one of means for detecting a temperature of a preheating chamber which varies with heat capacity of electronic parts on the circuit substrate, means for detecting heat capacity of electronic parts and means for inputting heat capacity of known electronic parts is provided.

For achieving the aforesaid objects, according to another characteristic of the present invention, when the heat capacity of the electronic parts is different in direction of the circuit substrate, the aforesaid means is used in every area classified according to a level of heat capacity of electronic parts to adjust the temperature of the preheating chamber.

Electronic parts different in heat capacity every substrate or every area of the substrate are placed on the circuit substrate. For example, electronic parts having a small heat capacity are heated to a level in excess of a preheating expected temperature in the preheating chamber by high temperature leaking gases from the reflow chamber so that solder melts and flows. To cope with this, low temperature gas is introduced into every circuit substrate or every area of the substrate, or high temperature leaked gas is discharged to extensively adjust the gas temperature in the preheating chamber, thus enabling provision of a desired preheating gas temperature. Thereby, the preheating temperature in the preheating chamber is made even and temperatures in various portions on the circuit substrate are equalized, whereby positive melting and adhesion of solder can be carried out in the reflow chamber.

DESCRIPTION OF THE PREFERRED EMBODIMENTS

Preferred embodiments of the present invention will be described hereinbelow with reference to FIGS. 1 to 20.

Figure 1:
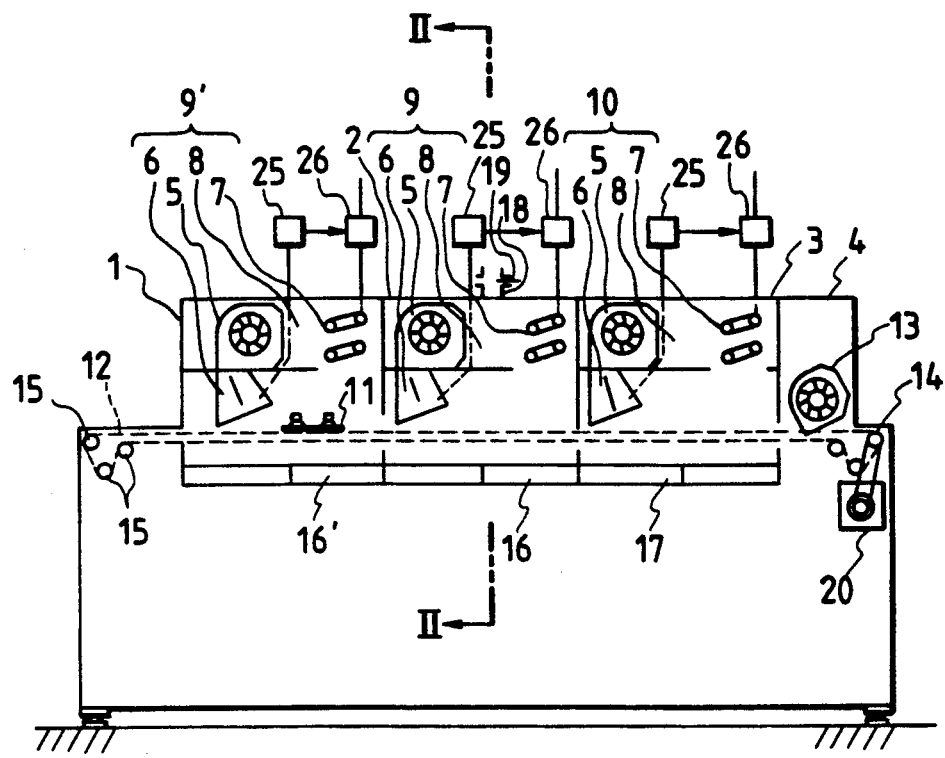
FIG. 1 is a sectional view schematically showing a reflow soldering apparatus according to one embodiment of the present invention.
Figure 2:
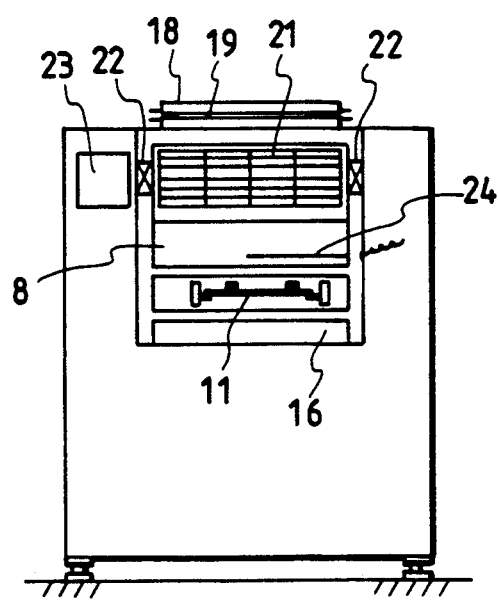
FIG. 2 is a sectional view taken on II—II of FIG. 1.

Referring now to the drawings wherein like reference numerals are used throughout the various views to designate like parts and, more particularly, to FIGS. 1 and 2, according to these figures, a reflow soldering apparatus comprises a preheating chamber first zone 1, a preheating chamber second zone 2, a reflow chamber 3 and a cooling chamber 4.

In the preheating chamber first zone 1, the preheating chamber second zone 2 and the reflow chamber 3, hot gas circulating means 9', 9, and 10 each comprising a cross flow blower 5, a divergent nozzle 6, a hot gas passage 8 and a heating heater 7 corresponding to the hot gas passage are disposed above a conveyor 12. Infrared face heaters 16', 16 and 17 are disposed below the conveyor 12. In a cooling chamber 4, a cooling fan 13 is installed obliquely of the conveyor 12.

The cross flow blower 5 is supported by the bearings 22 of both sides with an impeller 21 sandwiched therebetween as shown in FIG. 2 and driven by a blower motor 23.

The divergent nozzle 6 is directed at the oblique direction along the carrying direction of an object to be treated 11 and interiorly provided with a temperature sensor 24 for detecting a temperature of hot gas. The temperature sensor 24 is connected to a temperature adjuster 25 for setting a temperature and further to a power regulator 26 for controlling the heating heater 7.

An endless conveyor 12 for carrying the object 11 is extended under the lower surface of the hot gas circulating means 9', 9 and 10 through the preheating chamber first zone 1, the preheating chamber second zone 2 and the reflow chamber 3. A sprocket wheel 14 is driven by a conveyor driving motor 20 so that the conveyor 12 is driven so as to move the object 11 from left to right on the figure. Reference numeral 15 denotes an idler of the conveyor 12.

Next, a rise in temperature of the object 11 will be described taking an example in which heat medium is air.

The temperature of the air in the preheating chamber first zone 1 is elevated to a temperature suitable for preheating by the heating heater 7. The heated air passes through the hot gas passage 8 and is sucked into the cross flow blower 5. The air is increased in pressure by the impeller 21 and blown against the object 11 through the divergent nozzle 6. Heat is applied to the object 11 and air itself drops its temperature and is again elevated in temperature by the heating heater 7. The high temperature air is drawn into the cross flow blower 5 and is repeatedly circulated.

In the preheating chamber second zone 2, a free air introducing port 18 as a free air introducing means is provided above the hot gas circulating means 9 and on the suction side of the cross flow blower 5 and is provided with a damper 19 for controlling an amount of suction air. It is regulated so that free air is mixed with heated air before the free air is suctioned into the cross flow blower 5 so that the interior of the preheating chamber second zone 2 assumes a predetermined temperature.

The rise in temperature of the object 11 in the reflow chamber 3 is the same as in the case of the preheating chamber first zone 1. However, the temperature of air heated by the heating heater 7 is a temperature suitable for soldering, which is higher than a preheating temperature.

The object 11 having passed through the preheating chamber first zone 1 and the preheating chamber second zone 2 is cooled by a cooling fan 13 in a cooling chamber 4 after solder has been melted in the reflow chamber 3. Soldering is completed at predetermined temperature profile.

In the preheating chamber second zone 2, a low temperature free air can be drawn into the cross flow blower 5 in an amount as required evenly widthwise from the free air introducing port 18, and the temperature of air can be widely adjusted and the temperature of soldering portions can be equalized. The infrared face heaters 16 and 17 are suitable for simultaneously elevating temperature of the object 11 from the lower surface to prevent the object 11 from being thermally deformed and to provide a temperature difference between the circuit substrate for the object 11 and the soldering portions of electronic parts.

By the provision of the free air introducing port 18, the low temperature free air is automatically suctioned by a flow of gas resulting from rotation of the cross flow blower 5. Therefore, the gas temperature of the preheating chamber second zone 2 can be adjusted merely by adjustment of opening degree of the free air introducing port 18 by way of the damper 19 and energy is not always necessary for introduction of free air.

As shown in FIG. 2, preheating air having an even temperature in the entire width direction of the object 11 is evenly blown thereto from the divergent nozzle 6.

Therefore, the present embodiment is effective for the case where electronic parts having substantially equal heat capacity in the entire surface of the object 11 are mounted. In the stage of carrying the object 11 to the reflow chamber 3, wherein the opening degree of the free air introducing port 18 is varied by the damper 19 at every time the electronic parts different in heat capacity are mounted on the object 11, any kind of object 11 to be treated can be preheated to a substantially equal temperature, and a bridge or unmelt of solder is prevented from occurrence in the reflow chamber 3, thus enabling execution of positive soldering.

Figure 3:
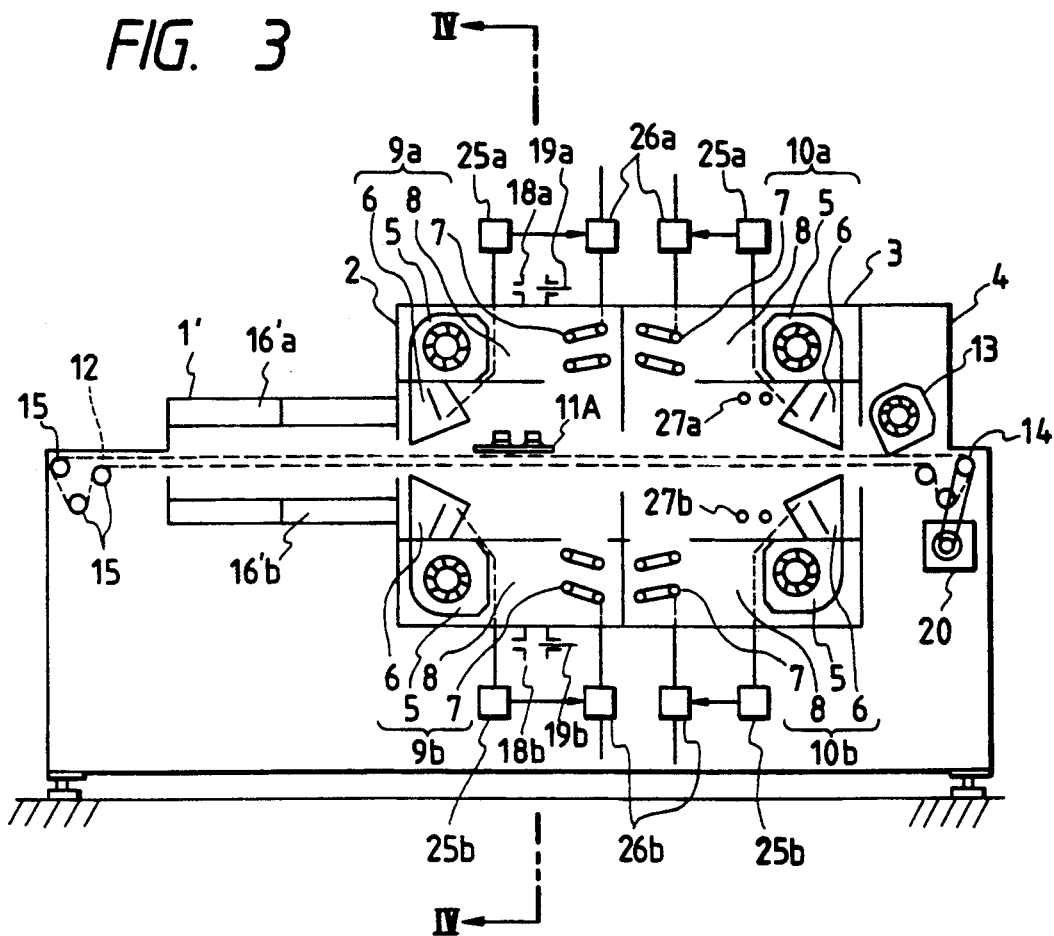
FIG. 3 is a sectional view schematically showing a reflow soldering apparatus according to a further embodiment of the present invention.
Figure 4:
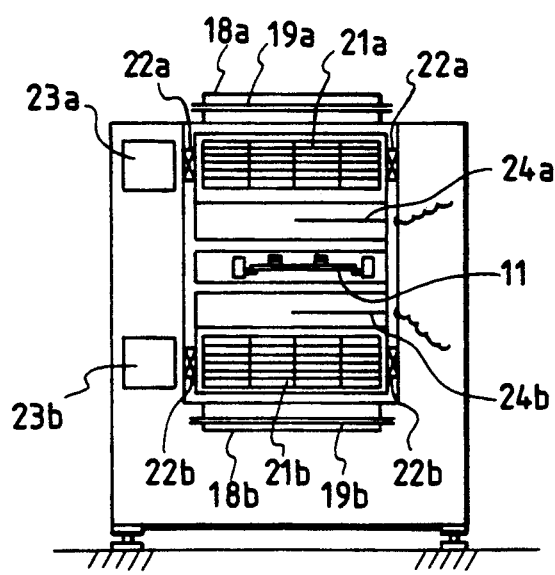
FIG. 4 is a sectional view taken on IV—IV of FIG. 3.

In the embodiments shown in FIGS. 3 and 4, in a preheating chamber first zone 1', infrared face heaters 16'a and 16'b are provided on the upper and lower surfaces of the conveyor 12. In the preheating chamber second zone 2 and the reflow chamber 3, hot gas circulating means 9a, 9b, 10a and 10b are provided symmetrically and vertically with respect to the conveyor 12. In the reflow chamber, infrared heaters 27a and 27b are provided. Of the subscripts attached to reference numerals throughout the drawing, a denotes an upper side and b denotes a lower side.

The second embodiment is suitable for an object to be treated 11A in which electronic parts are mounted on both surfaces of a circuit substrate.

The second embodiment is further suitable for when electronic parts mounted on the circuit substrate are possibly moved undesirably by the blowing of hot gas in the preheating chamber first zone 1'. More specifically, in the preheating chamber first zone 1' in which an adhesive force of soldering paste is small, the electronic parts can be preheated without being moved from the circuit substrate by elevating temperature due to radiation from the infrared face heaters 16'a and 16'b In the preheating chamber second zone 2 and thereafter zones in which the adhesive force of soldering paste increases, hot gas can be used for heating.

Figure 5:
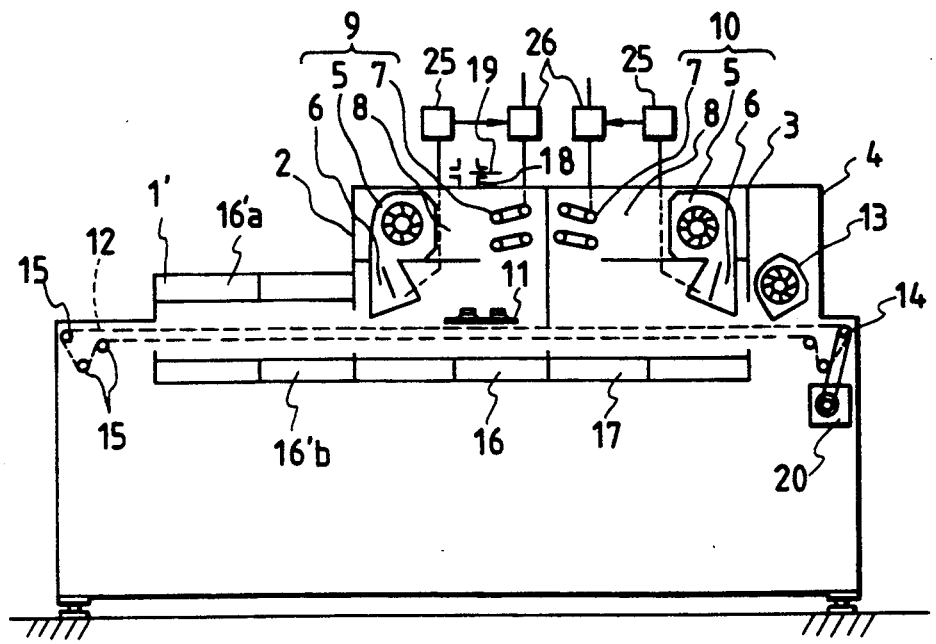
FIG. 5 is a sectional view schematically showing a reflow soldering apparatus according to still another embodiment of the present invention.

In the embodiment shown in FIG. 5, infrared heaters 16 and 17 are arranged on the lower surfaces of the preheating chamber second zone 2 and the reflow chamber 3 in the second embodiment (FIG. 3).

This embodiment is suitable for providing a temperature difference between the upper and lower sides of the object 11.

Figure 6:
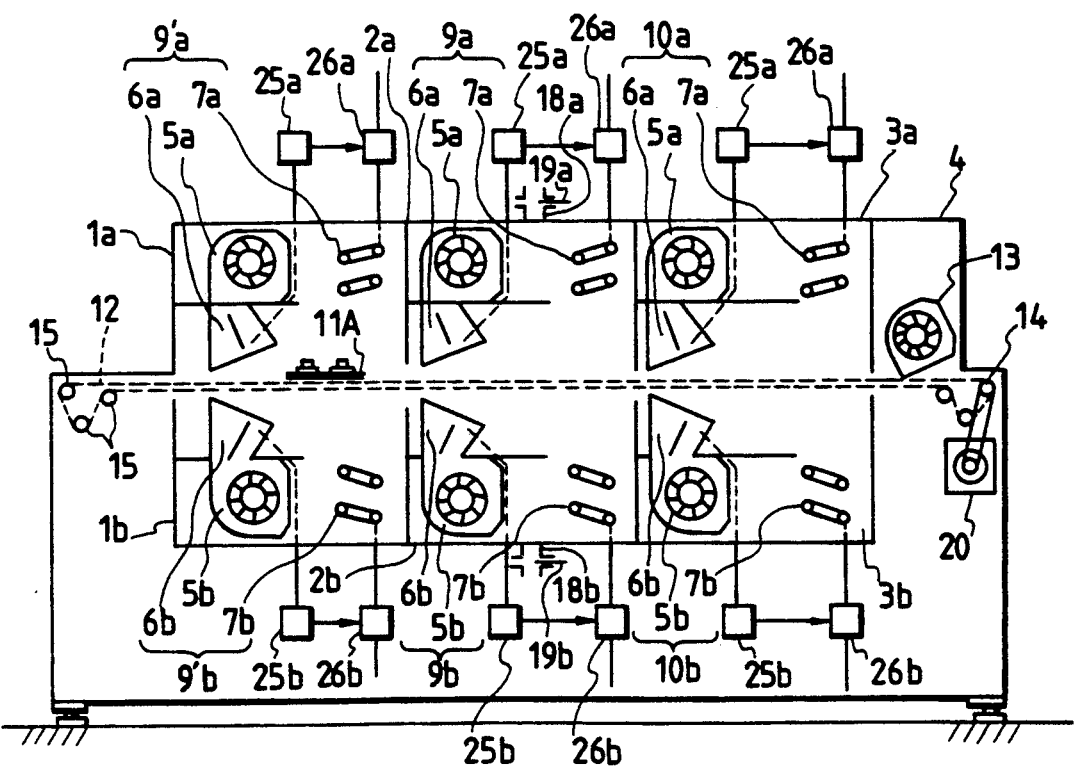
FIG. 6 is a sectional view schematically showing a reflow soldering apparatus according to a fourth embodiment of the present invention.

In the embodiment shown in FIG. 6, hot gas circulating means 9'b, 9b and 10b, free air introducing port 18b and a damper 19b are provided on the lower surface of the conveyor 12 in the first embodiment (FIG. 1) symmetrically to the upper surface thereof.

This embodiment is suitable for providing a temperature difference between the upper and lower sides of the object and for processing the object 11A in which electronic parts are mounted on both surfaces of the circuit substrate.

Figure 7:
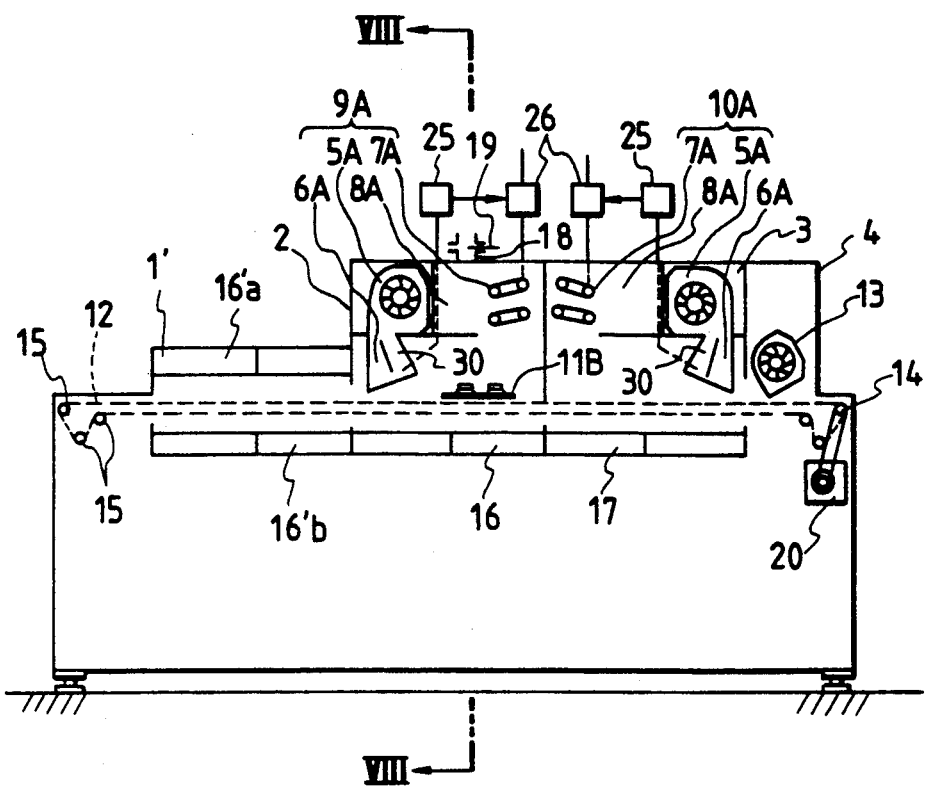
FIG. 7 is a sectional view schematically showing a reflow soldering apparatus according to a fifth embodiment of the present invention.

In the embodiment shown in FIG. 7, the preheating chamber second zone 2 and the reflow chamber 3 are provided with hot gas circulating means 9A and 10A comprising a cross flow blower 5A, a nozzle 6A, and a hot gas passage 8A having passages divided widthwise, a heating heater 7A corresponding to the divided passage, and a temperature sensor 24. The hot gas passage 8A, the cross flow blower 5A and the nozzle 6A are divided widthwise by a partitioning wall 28, a partitioning wall 29 (as shown in FIG. 9) and a partitioning wall 30 (as shown in FIG. 8), respectively.

Because the hot gas circulating means 9A and 10A are configured as described above, the hot gas can be applied in such a way to the object 11 that the flow velocity of hot gas can be made to be uniform in the width direction and in the carrying direction and the hot gas can be made to have temperatures set to a values corresponding to the heat capacities in widthwise of electronic parts of the object 11. Even in the object 11B in which electronic parts extremely different in heat capacity widthwise are mounted, the solder can be evenly remelted. Accordingly, an unmelt or the like of soldering portions can be prevented.

Figure 8:
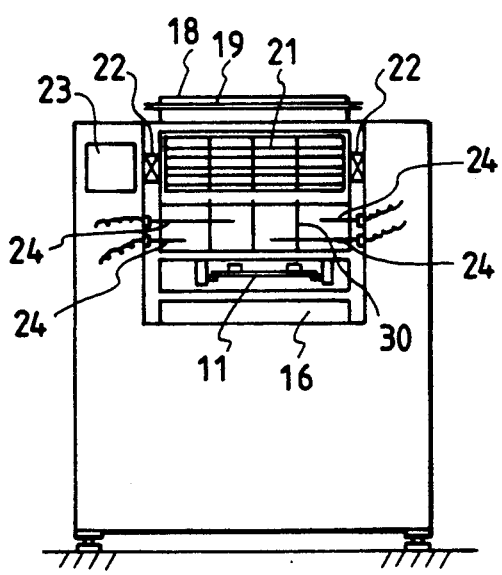
FIG. 8 is a sectional view taken on VIII—VIII of FIG. 7.
Figure 9:
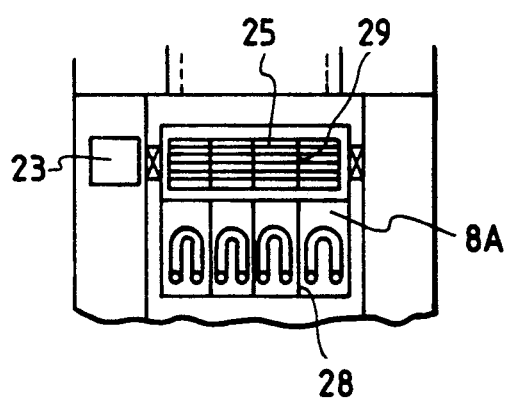
FIG. 9 is a plan view of essential parts of FIG. 7.
Figure 10:
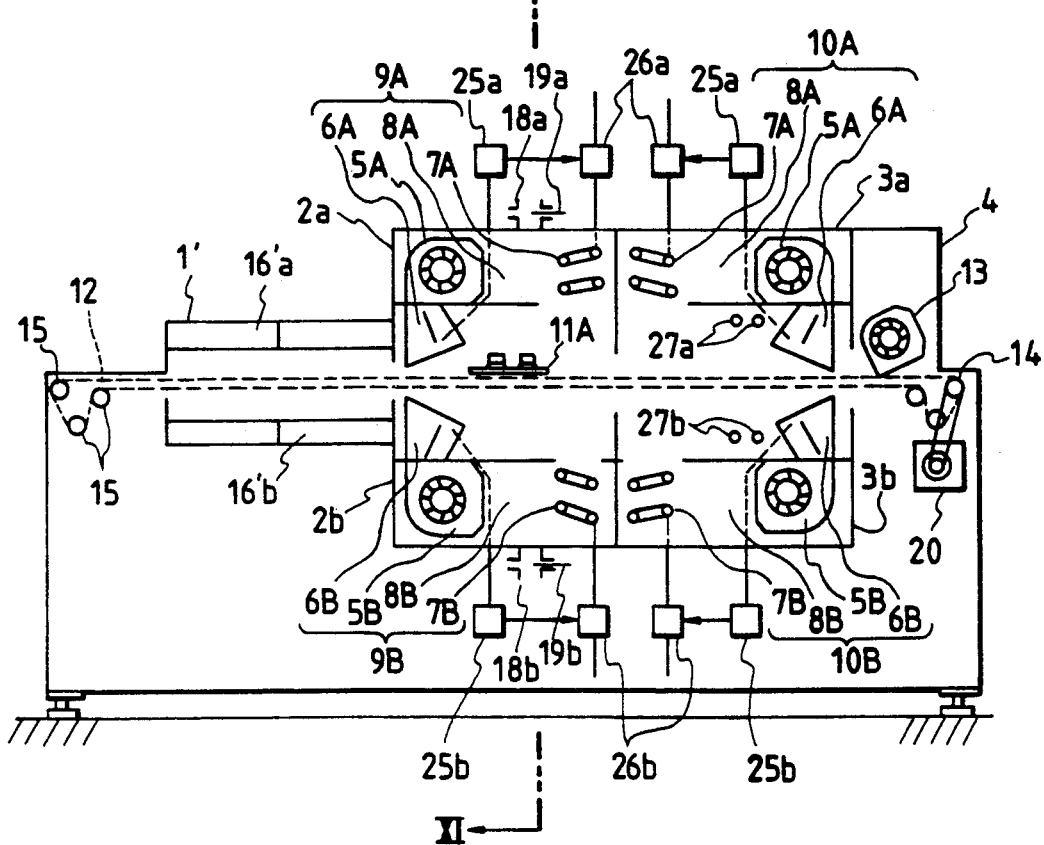
FIG. 10 is a sectional view schematically showing a reflow soldering apparatus according to a sixth embodiment of the present invention.
Figure 11:
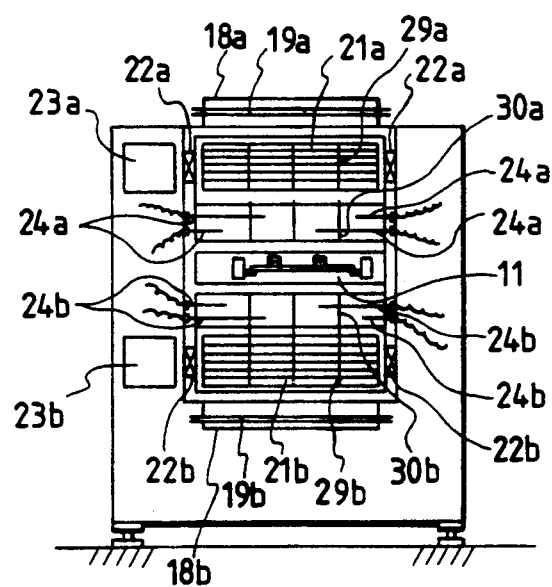
FIG. 11 is a sectional view taken on XI—XI of FIG. 10.

In embodiments shown in FIGS. 10 and 11, hot gas circulating means 9B and 10B are provided on the lower surface of the conveyor 12 in addition to the hot gas circulating means 9A and 10A in the fifth embodiment shown in FIGS. 7 and 8.

This embodiment is suitable for providing a temperature difference between the upper and lower sides of the object 11 and for soldering the object 11A in which electronic parts are mounted on both surfaces of the circuit substrate, in addition to the effects of the previous fifth embodiment.

In the FIG. 12 embodiment, an exhaust port 31 is provided below the hot gas passage 8 of the preheating chamber second zone 2 in the third embodiment shown in FIG. 5, and an exhaust fan 32 is provided below the infrared heaters 16', 16. This exhaust fan 32 is provided with an air flow adjusting damper 36.

According to this embodiment, since there is exhausted the hot gas having an amount corresponding to the amount of free air taken into the preheating chamber second zone 2 from the free air introducing port 18, no hot gas issues from a charging portion CP of the apparatus and a discharging portion DP of the apparatus.

Figure 12:
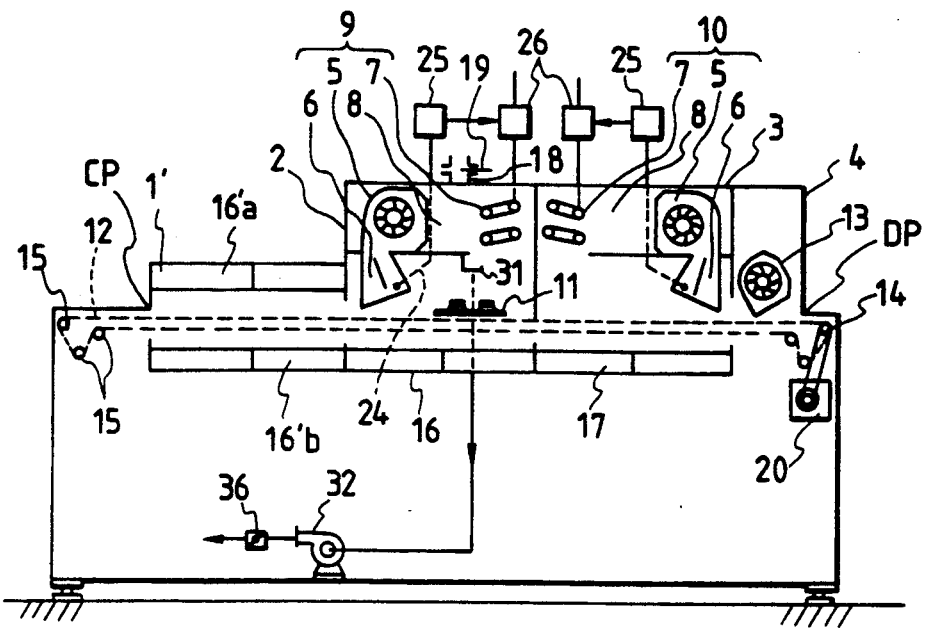
FIG. 12 is a sectional view schematically showing a reflow soldering apparatus according to a seventh embodiment of the present invention.
Figure 13:
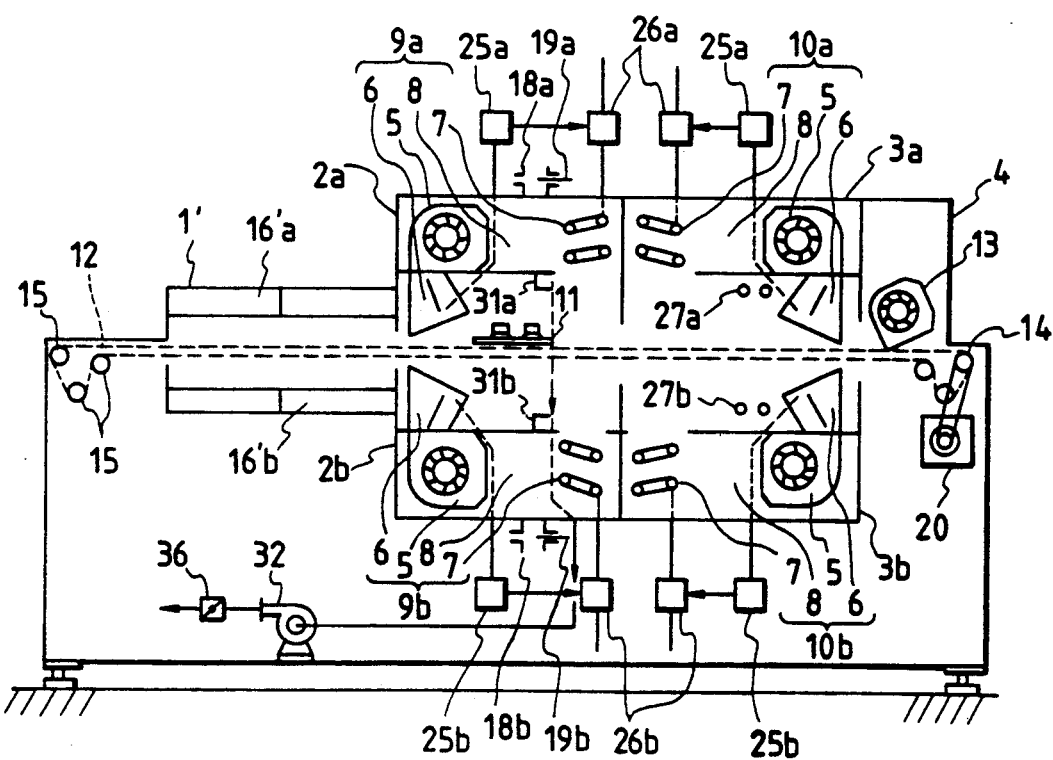
FIG. 13 is a sectional view schematically showing a reflow soldering apparatus according to an eighth embodiment of the present invention.

The embodiment of FIG. 13 is different form the seventh embodiment shown in FIG. 12 in that hot gas circulating means 9a and 10a are provided on the upper surface of the conveyor 12, and hot gas circulating means 9b and 10b are provided on the lower surface of the conveyor 12.

In this embodiment, hot gas having an amount corresponding to an amount of free air taken into the preheating chamber second zones 2a and 2b from the free air introducing ports 18a and 18b are discharged by the exhaust fan 32 into open air through the exhaust ports 31a and 31b in the upper and lower surfaces of the conveyor 12.

Figure 14:
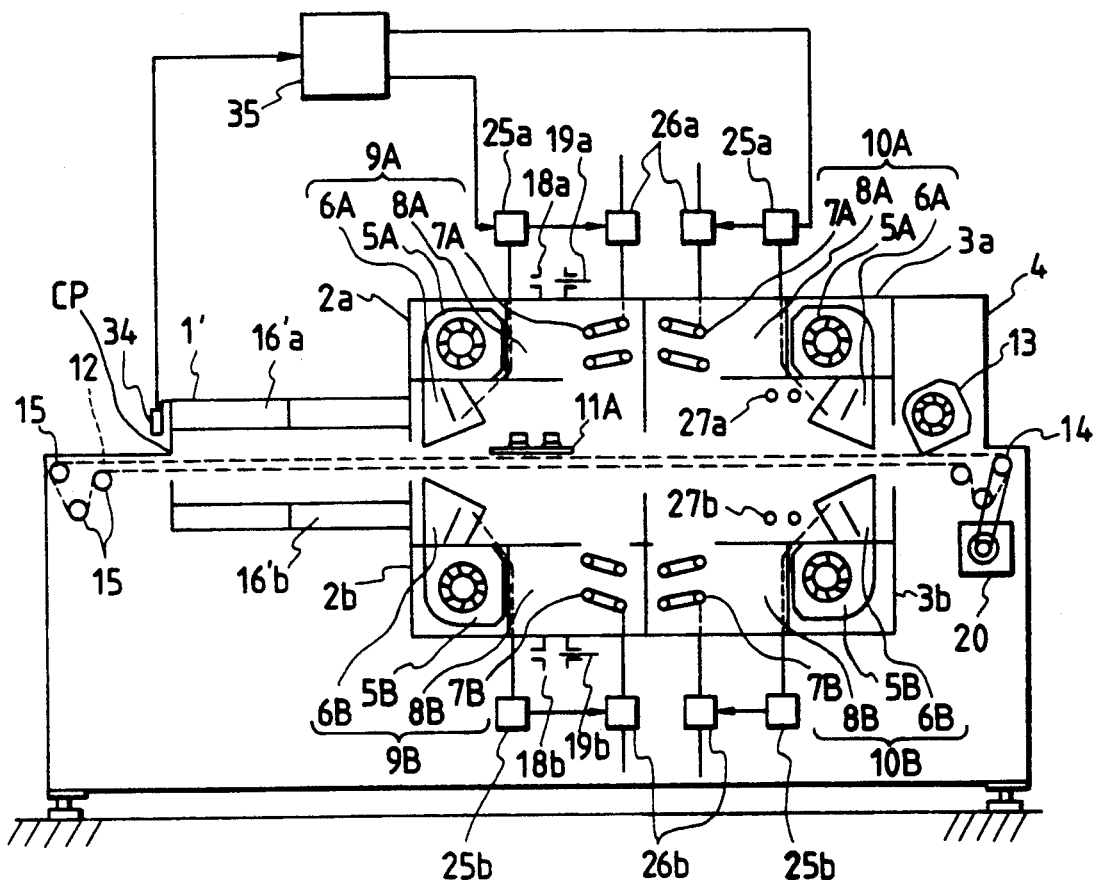
FIG. 14 is a sectional view schematically showing a reflow soldering apparatus according to a ninth embodiment of the present invention.

The embodiment of FIG. 14 is different from the sixth embodiment shown in FIG. 10 in that a plurality of heat capacity detection sensors 34, capable of detecting the height of the object 11A, are arranged at a charging portion CP of the apparatus widthwise so as to correspond to the number of hot gas passages. Since the heat capacity of electronic parts which are present over a predetermined width of the circuit substrate is determined by the height and length, the heat capacity is obtained by detecting a variation of height to time. Accordingly, heights of the object in the carrying direction in which the heat capacity detection sensors 34 are measured widthwise. This data is incorporated into a personal computer 35, for example, to compute the widthwise distribution of the heat capacity. The set values of the temperature adjusters 25a and 25b are designated by the personal computer according to the computed values.

In this embodiment, the set value of the hot gas temperature can be determined in a quicker manner and with high precision to control the same.

Figure 15:
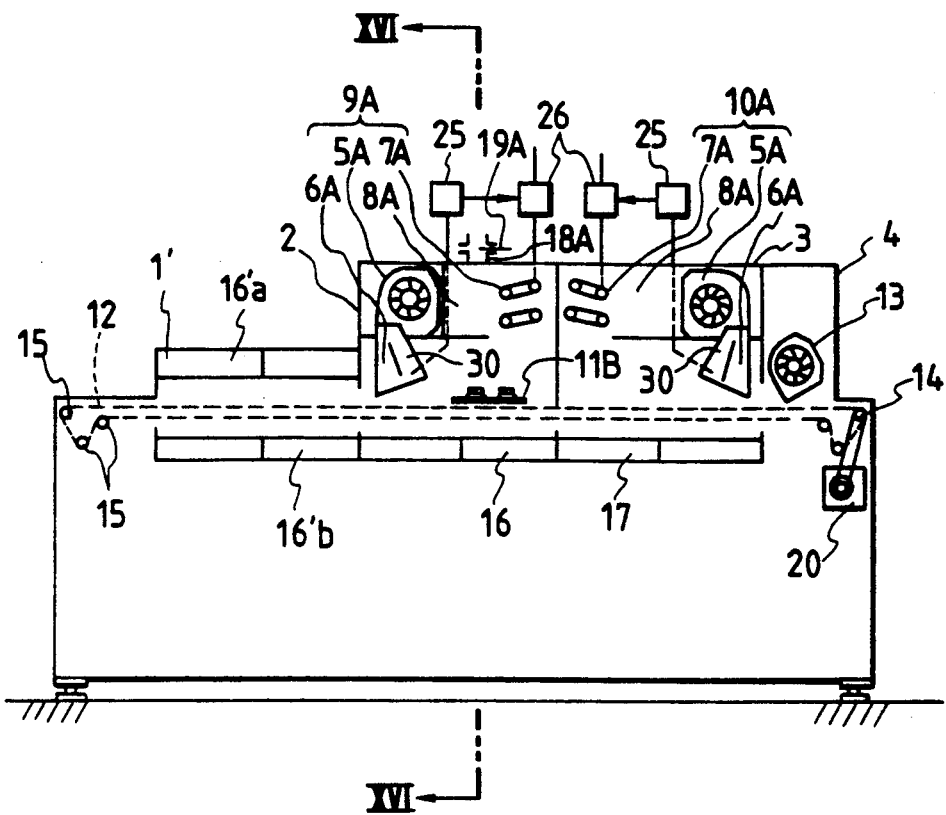
FIG. 15 is a sectional view schematically showing a reflow soldering apparatus according to a tenth embodiment of the present invention.
Figure 16:
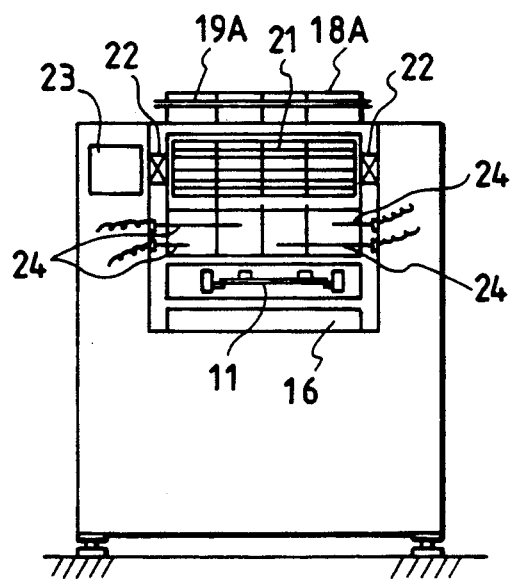
FIG. 16 is a sectional view taken on XVI—XVI of FIG. 15.
Figure 17:
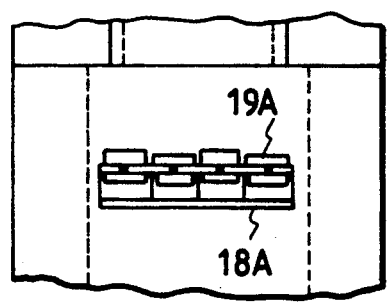
FIG. 17 is a plan view of essential parts of FIG. 15.

The tenth embodiment shown in FIGS. 15, 16 and 17 is different from the fifth embodiment shown in FIGS. 7, 8 and 9 in that the free air introducing port 18A is divided widthwise into plural numbers corresponding to the number of hot gas passages, and a plurality (four in the figure) of dampers 19A are provided accordingly.

In this embodiment, an opening area of the free air introducing port 18A can be changed along with the set value of the hot gas temperature, and therefore, this embodiment is suitable for soldering the object 11B extremely different in widthwise heat capacity.

Figure 18:
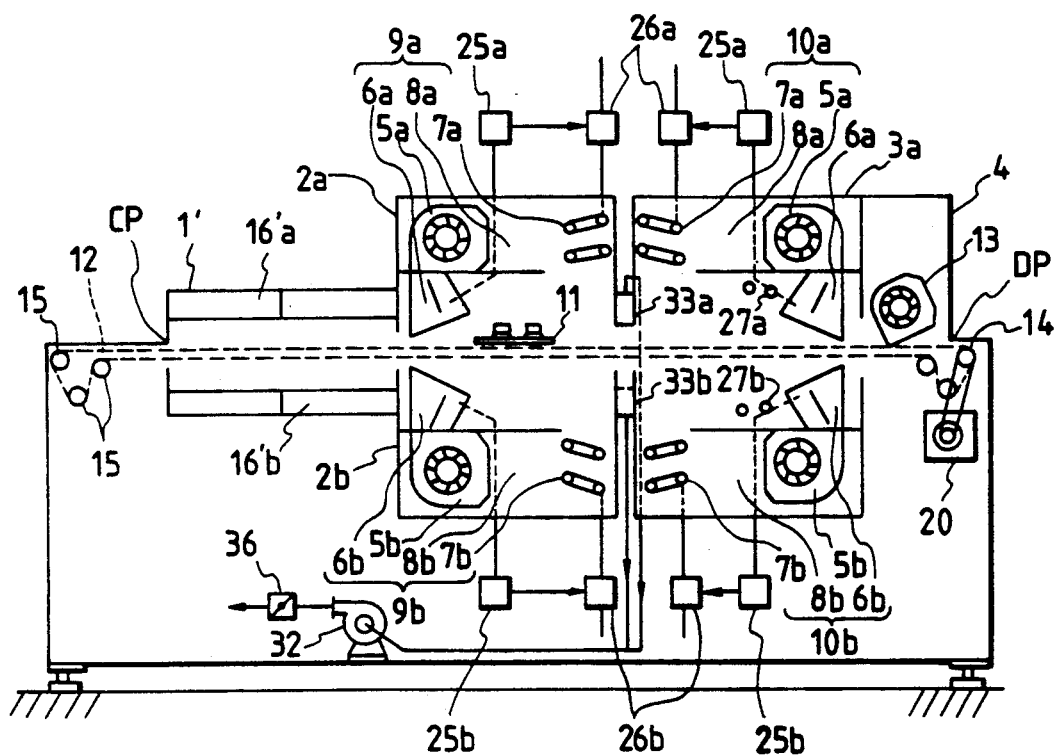
FIG. 18 is a sectional view schematically showing a reflow soldering apparatus according to an eleventh embodiment of the present invention.

The eleventh embodiment shown in FIG. 18 is different from the eighth embodiment shown in FIG. 13 in that the free air introducing port 18 is not provided but an intermediate exhaust ports 33a and 33b are provided between the preheating chamber second zone 2 and the reflow chamber 3. High temperature hot gas which leaks from the reflow chamber 3 to the preheating chamber second zone 2 is discharged into open air by the intermediate exhaust ports 33a and 33b.

In the embodiment shown in FIG. 18, the exhaust fan 32 for exhaust is necessary but no hot gas leaks from the charging portion CP of the apparatus or the discharging portion DP of the apparatus.

The exhaust amount of the exhaust fan 32 is automatically or manually adjusted by the flow rate adjusting damper 36 in connection with the hot gas temperature in the cross flow blowers 5a and 5b or the preheating chamber second zone 2.

In this embodiment, the preheating chamber second zone 2 has less of a portion which is elevated in temperature by the leaking gas from the reflow chamber 3, and the temperature management of the preheating chamber second zone 2 can be achieved with high precision.

Figure 19:
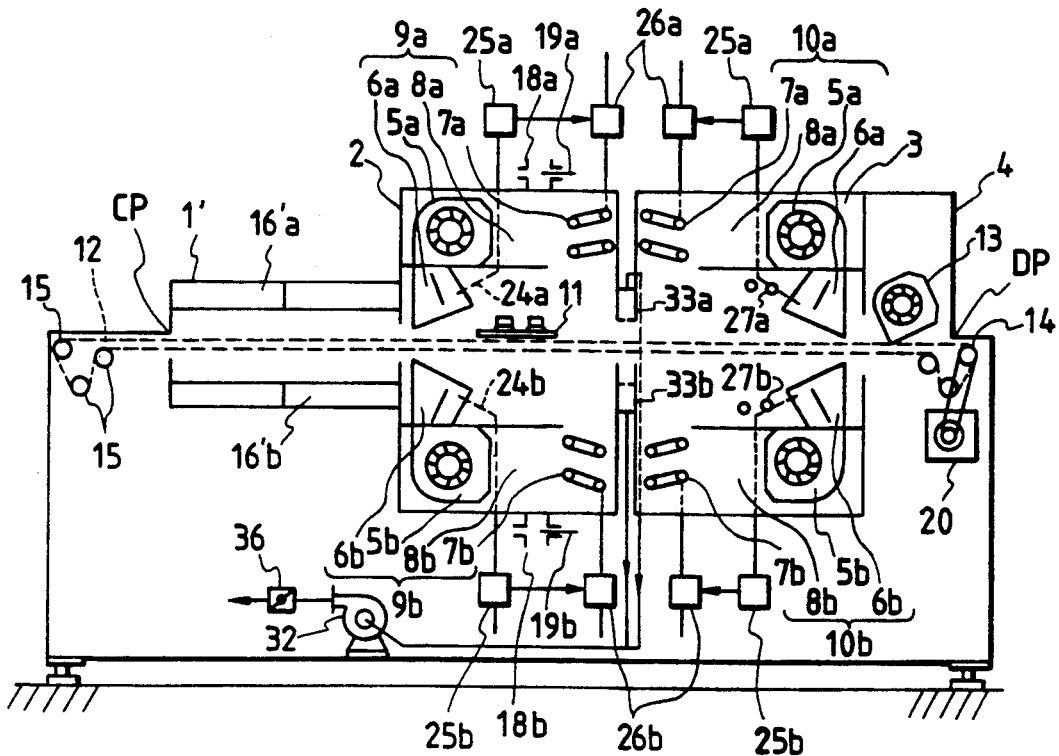
FIG. 19 is a sectional view schematically showing a reflow soldering apparatus according to a twelfth embodiment of the present invention.

The twelfth embodiment shown in FIG. 19 is different from the eleventh embodiment shown in FIG. 18 in that free air introducing ports 18a and 18b are provided in the preheating chamber second zone 2, and intermediate exhaust ports 33a and 33b are provided between the preheating chamber second zone 2 and the reflow chamber 3.

Hot gas, having an amount corresponding to the amount of free air introduced from the free air introducing ports 18a and 18b, is exhausted by the exhaust fan 32 into open air from the intermediate exhaust ports 33a and 33b.

In the embodiment of FIG. 19, low temperature open air is introduced into the preheating chamber second zone 2 and hot gas is exhausted from the intermediate exhaust ports 33a and 33b. Therefore, the range of temperature adjustment is wide, and hot gas less leaks from the charging portion CP of the apparatus or the discharging portion DP of the apparatus.

Figure 20:
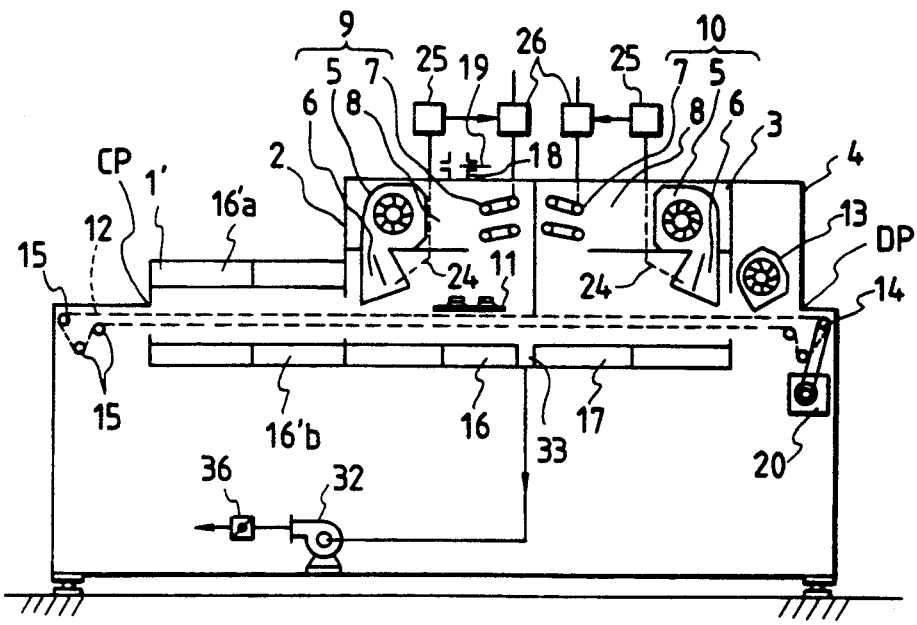
FIG. 20 is a sectional view schematically showing a reflow soldering apparatus according to a thirteenth embodiment of the present invention.
Figure 21:
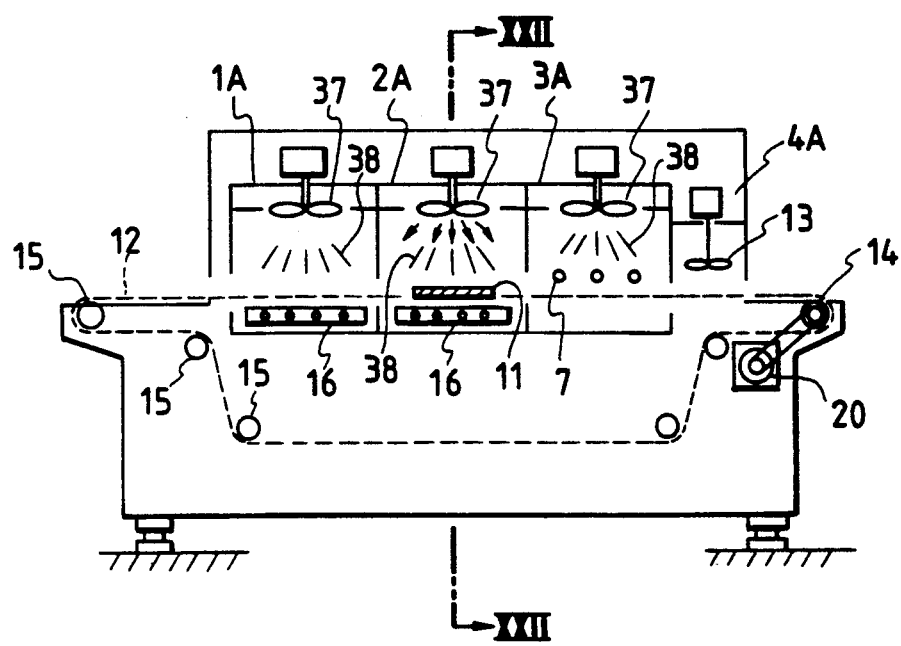
FIG. 21 is a sectional view schematically showing a conventional reflow soldering apparatus.
Figure 22:
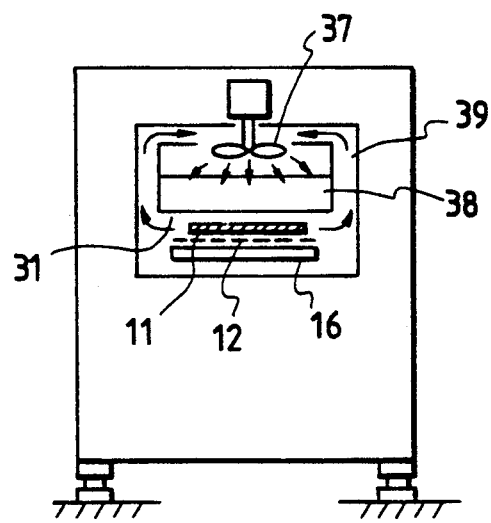
FIG. 22 is a sectional view taken on XXII—XXII of FIG. 21.

The thirteenth embodiment shown in FIG. 20 is different from the seventh embodiment shown in FIG. 12 in that an intermediate exhaust port 33 is provided between the infrared face heaters 16 and 17 on the lower surface of the conveyor 12 in the preheating chamber second zone 2.

In this embodiment, low temperature open air is introduced into the preheating chamber second zone 2 and hot gas is exhausted out of the intermediate exhaust port 33. Therefore, less hot gas leaks out of the charging portion CP of the apparatus or the discharging portion DP of the apparatus, similarly to the seventh embodiment.

As described above in detail, the present invention can provide a reflow soldering method and system therefor capable of evenly preelevate temperatures of soldering portions of various circuit substrates different in heat capacity and electronic parts to be mounted.

The present invention can further provide a reflow soldering method and system therefore capable of evenly preelevating temperatures of soldering portions of various circuit substrates different widthwise in heat capacity and electronic parts to be mounted.

What is claimed is:

1. A reflow soldering method for successively heating objects to be treated in which electronic parts are placed on a circuit substrate coated with solder while being carried into a preheating chamber and a reflow chamber adjacent thereto to melt said solder so as to solder said electronic parts on said circuit substrate, wherein a temperature for heating the objects to be treated in said preheating chamber is adjusted at least by introducing a low temperature gas into the preheating chamber in accordance with a heat capacity of the electronic parts on said circuit substrate and to a high temperature hot gas leaking from said reflow chamber into said preheating chamber.

2. A reflow soldering method according to claim 1, wherein either introduction of a low temperature gas into the preheating chamber or exhaust of at least a part of the high temperature hot gas which leaks from the reflow chamber into the preheating chamber is carried out.

3. A reflow soldering method according to claim 1, wherein a temperature for heating the objects to be treated in the preheating chamber is adjusted on the basis of an output of either at least means for detecting a temperature of an interior of the preheating chamber, means for detecting a heat capacity of the electronic parts or means for inputting a heat capacity of known electronic parts.

4. A reflow soldering method according to claim 1, wherein, when the heat capacity of the electronic parts is different in a widthwise direction of the circuit substrate or in every circuit substrate, a temperature for heating the objects to be treated in the preheating chamber is adjusted widthwise of the circuit substrate or every circuit substrate.

5. A reflow soldering system in which while carrying objects to be treated in which electronic parts are placed on a circuit substrate coated with solder into a preheating chamber and a reflow chamber adjacent thereto, hot gases are blown against said objects to be treated by cross flow blowers provided in said preheating chamber and said reflow chamber to melt solder so as to solder said electronic parts on said circuit substrate, wherein free air introducing means is controllably provided in the vicinity of an intake port of said cross flow blower in said preheating chamber.

6. A reflow soldering system according to claim 5, wherein means are provided for exhausting a gas having an amount corresponding to that of free air taken into the preheating chamber from the free air introducing means, from said preheating chamber.

7. A reflow soldering system in which objects to be treated in which electronic parts are placed on a circuit substrate coated with solder are successively heated while being carried into a preheating chamber and a reflow chamber adjacent thereto to melt said solder so as to solder said electronic parts on said circuit substrate, wherein means for exhausting at least a part of a high temperature gas leaking from said reflow chamber into said preheating chamber is provided in a boundary portion between said preheating chamber and said reflow chamber.

8. A reflow soldering method for successively heating objects to be treated in which electronic parts are placed on a circuit substrate coated with solder while being carried into a preheating chamber and a reflow chamber adjacent thereto to melt said solder so as to solder said electronic parts on said circuit substrate, wherein a temperature for heating the objects to be treated in said preheating chamber is adjusted by exhausting at least a part of the high temperature hot gas which leaks from the reflow chamber into the preheating chamber in a boundary portion between said preheating chamber and said reflow chamber in accordance with a heat capacity of the electronic parts on said circuit substrate and to said high temperature hot gas leaking form said reflow chamber into said preheating chamber.

* * * * *